July 19, 1927.
W. A. BERNARD
1,636,088
HAND TOOL
Filed July 29, 1925
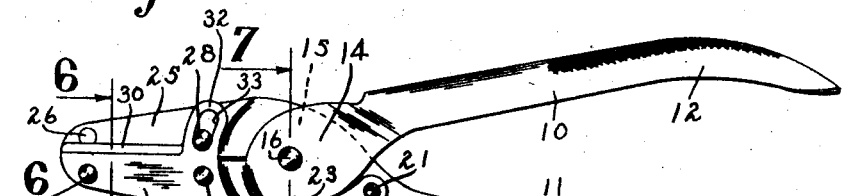
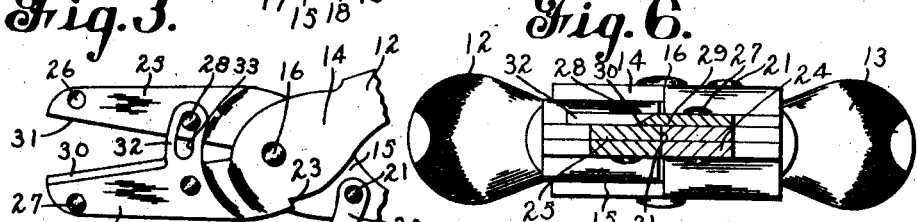
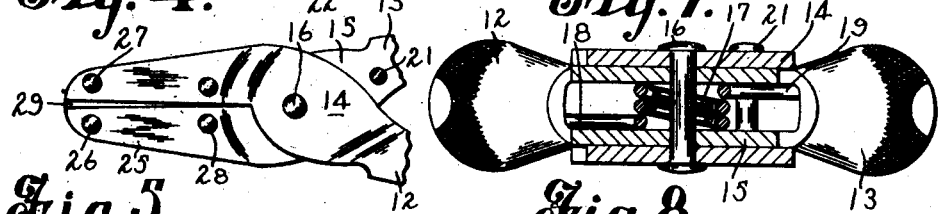
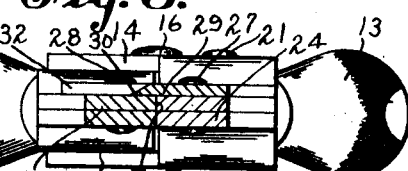
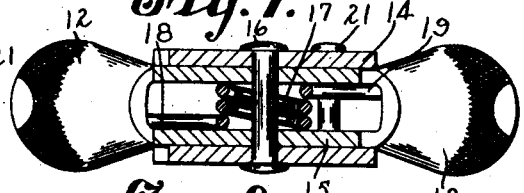
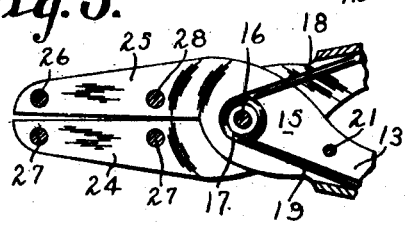
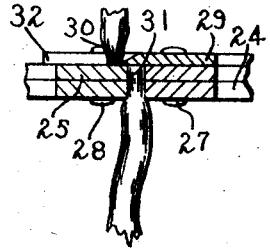
Inventor
William A. Bernard
By Henry E. Rockwell
Attorney Patented July 19, 1927.

1,636,088

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT.

HAND TOOL.

Application filed July 29, 1925. Serial No. 46,911.

This invention relates to hand tools, and more especially to the type of hand tools or devices for use in clipping flowers or fruit from the plant in such a manner that the flower or fruit will be retained by the tool after cutting. More particularly this invention contemplates new and useful improvements in the construction of tools of this character, so that the above operation may be accomplished efficiently, and that the advantages of this type of tool will be retained.

One of the objects of this invention is to provide an improved hand tool of the above type which will be inexpensive to manufacture and which will efficiently perform the operations required thereof.

Another object of this invention is to generally improve hand tools of the above type by providing a new and useful jaw construction in combination with a cutting blade and operating handles.

Still another object of this invention is to provide an improved hand tool wherein the jaws are formed directly from the material used for the operating handle, and in which one of the jaws forms both stem-gripping and cutting means by cooperating respectively with an opposed stem-gripping jaw and a cutting blade.

To these and other ends the invention consists in the novel features and combination of parts to be hereinafter described and claimed.

In the accompanying drawings:

Fig. 1 illustrates a hand tool of a well-known type, embodying the features of this invention;

Fig. 2 is an edge view of the tool shown in Fig. 1;

Fig. 3 is a partial view of the tool shown in Fig. 1, showing the open position of the jaws and adjacent parts;

Fig. 4 is a view of the reverse side of the tool shown in Fig. 1, the operating handles being omitted for the sake of clearness;

Fig. 5 is a section on line 5—5 of Fig. 2;

Fig. 6 is a section on line 6—6 of Fig. 1;

Fig. 7 is a section on line 7—7 of Fig. 1; and

Fig. 8 is a sectional view through the jaw members and the cutting blade substantially on line 6—6 of Fig. 1, showing the operation thereof upon a stem of a flower or a fruit.

The hand tool selected to illustrate the features of this invention comprises the crossed members 10 and 11. The members 10 and 11 are, in this instance, formed of sheet-metal being substantially U-shaped in cross-section at the handle portions 12 and 13, respectively. The arms of the U-shape of each member are extended beyond the U-shaped handle portion in one direction and form bifurcated portions 14 and 15, respectively. The members 10 and 11 cross each other at the bifurcated portions 14 and 15 thereof, the portions 15 being straddled by the sides of the portions 14. A pivot pin 16 passes through the portions 14 and 15 at this point, whereby the members 10 and 11 are pivotally connected together.

A spring 17 is coiled about the pivot pin 16 between the sides of the portions 15 in such a manner that the arms 18 and 19 thereof will engage the inner surface of the U-shaped handle portions 12 and 13, as shown in Fig. 5, and whereby the tension thereof will urge the handle portions into open or extended position. A pawl 20 pivoted to the handle portion 13 by a pin 21 is provided, which by the engagement of its free end 22 within a notch 23, cut into one of the sides of the portion 14, holds the handle portions 12 and 13 in closed position. By releasing the pawl from this engagement the handle portions are free to be acted upon by the spring 17, as above described.

The material forming the members 10 and 11 is continued beyond the portions 14 and 15 to form a pair of opposing jaws. The material forming the sides of the portion 15 is compressed towards each other into contact to form the jaw 25 and that forming the sides of the portion 14 forming the jaw 24. These portions are riveted together by rivets 26, 27 and 28, whereby a pair of substantially rigid laminated jaws are formed integral with the handle members 12 and 13. The rivet 26 terminates flush with the side surface of the jaw 25, while the rivet 28 extends outwardly beyond this surface for a purpose to be hereinafter described. The jaws 24 and 25, when closed by the manipulation of the handle portions 12 and 13, respectively, constitute the gripping means of this hand tool, being capable of gripping an object therebetween, as shown in Fig. 8.

A cutting blade 29 is provided and is located upon one side surface of the jaw 24, being retained securely thereon by means of the rivets 27, which also secure the two parts of the jaw 24 together. The cutting blade 29 is provided with a cutting edge 30. The cutting edge 30 when the jaws 24 and 25 are closed together, passes the adjacent edge 31 of the jaw 25, as shown in Figs. 6 and 8, and shear apart an article placed therebetween, see Fig. 8.

An extension 32 integral with the cutting blade 29 extends from the blade 29 toward the jaw 25, over the adjacent side surface thereof and is arcuate in form, the pivot pin 16 being its center. This extension is provided with an elongated opening 33 in which the rivet 28 rides. The cooperation between the rivet 28 and the edges of the opening 33, guides the jaws in their opening and closing movement, and the cooperation of the adjacent contacting surfaces of the extension 32 and the jaw 25 prevents to some extent lateral displacement of the cutting edge 30 from the cooperating edge 31 of the jaw 25. In addition to the guiding feature of the extension 32, this part is also adapted to limit the opening movement of the jaws when the rivet 28 abuts against the surface of the end edge of the opening 33, as shown in Fig. 3.

The novel and efficient hand tool, or in this instance, a flower or fruit picker or clipper, is adapted by means of the laminated jaws 24 and 25, which are formed integral with the operating handles by compressing the arm portions of the U-shaped handles together, and because of the cooperation of the cutting blade 29 and the cutting edge 31 to substantially simultaneously cut the stem of a fruit or flower and to grip the stem thereof to hold the same from falling, as illustrated in Fig. 8. The construction of each of the jaws and the handle members from one piece of sheet-metal by a series of punching operations, provides a tool especially inexpensive to manufacture. By compressing the material into contact to form the jaws, provides a rigid and sturdy jaw structure. This construction provides jaw members of substantially twice the thickness of that of the handle members, and when riveted or otherwise joined together, forms a tool which is a particularly rigid structure throughout and which will not have a tendency to spring apart at any of its cooperating points, inasmuch as the direction of the application of the operating force is substantially in alinement with the longitudinal center lines of the cooperating parts.

While I have illustrated and described one form of hand tool, embodying the features of my invention, it is to be understood that the invention is not limited thereto in all of its details, but is capable of many modifications and variations which will lie within the spirit of the invention and the scope of the appended claims.

What I claim is:

1. In a hand tool, a pair of members, each being formed from a strip of sheet-metal and each comprising a handle portion U-shaped in cross-section at one end thereof, a bifurcated joint portion intermediate the ends thereof, and a laminated jaw portion at the other end thereof.

2. In a hand tool, a pair of members, each being formed from a strip of sheet-metal and each comprising a handle portion substantially U-shaped in cross-section a portion of the length of said strip, and a bifurcated portion the remainder of the strip, a part of said bifurcated portion being compressed together into contact to form a gripping jaw.

3. In a hand tool, a pair of members, each being formed from a strip of sheet-metal and each comprising a handle portion and a bifurcated portion, the outer end of said bifurcated portion being pressed together to form a laminated jaw.

4. A hand tool comprising a pair of members, each member being formed from a single strip of sheet-metal and having a handle portion substantially U-shaped in cross-section, extending for a portion of the length of said member, and a bifurcated portion presenting a pair of spaced-apart members extending from the U-shaped handle portion toward an end of said member, the members of said bifurcated portion being compressed together at the end of said member to form a jaw.

5. An operating member composed of sheet-metal for a hand tool or the like, comprising a handle portion substantially U-shaped in cross-section for a portion of the length of said member, the material forming the arms of the U-shape being extended longitudinally of the member in one direction and being spaced apart intermediate the ends thereof and compressed together at the end thereof to form a jaw.

6. In a hand tool, a pair of combined handle and jaw members, each of said members being formed from a strip of sheet-metal and comprising a handle portion substantially U-shaped in cross-section, the sides of the U-shape being extended beyond the handle portion at one end thereof and compressed together to form a jaw portion.

7. In a hand tool, a pair of combined handle and jaw members, each of said members being formed from a strip of sheet-metal and comprising a handle portion having spaced-apart sides, the outer edges of which are joined together by the material thereof, said sides extending beyond said handle portion and compressed together to form a laminated jaw portion, the edges of the sides forming said jaw portion corresponding to the joined-together edges of said handle portion and forming a gripping surface for each of said jaw portions.

8. In a hand tool, a pair of combined handle and jaw members, each of said members being formed from a strip of sheet-metal and comprising a handle portion having spaced-apart sides the outer edges of which are joined together by the material thereof, said sides extending beyond said handle portion and compressed together to form a laminated jaw portion, the edges of the sides forming said jaw portion corresponding to the joined-together edges of said handle portion and forming a gripping surface for each of said jaw portions, and a cutting blade upon the side of one of said jaws having a cutting edge adapted to cooperate with an adjacent edge of the other jaw to shear an article placed therebetween.

9. In a hand tool, a pair of combined handle and jaw members, each of said members being formed from a strip of sheet-metal and comprising a handle portion having spaced-apart sides the outer edges of which are joined together by the material thereof, said sides extending beyond said handle portion and compressed together to form a laminated jaw portion, the edges of the sides forming said jaw portion corresponding to the joined-together edges of said handle portion and forming a gripping surface for each of said jaw portions, and a cutting blade upon the side of one of said jaws having a cutting edge adapted to cooperate with an adjacent edge of the other jaw to shear an article placed therebetween, said cutting blade having an extension directed toward and over the last-mentioned jaw to guide the cutting edge in relation to said jaw.

10. In a hand tool, a pair of combined handle and jaw members, each of said members being formed from a strip of sheet-metal and comprising a handle portion having spaced-apart sides the outer edges of which are joined together by the material thereof, said sides extending beyond said handle portion and compressed together to form a laminated jaw portion, the edges of the sides forming said jaw portion corresponding to the joined-together edges of said handle portion and forming a gripping surface for each of said jaw portions, and a cutting blade upon the side of one of said jaws having a cutting edge adapted to cooperate with an adjacent edge of the other jaw to shear an article placed therebetween, said cutting blade having an extension directed toward and over the last-mentioned jaw, said extension being provided with an elongated opening adapted to receive a stud member upon said last-mentioned jaw and to limit the opening movement of said jaws.

11. In a hand tool, a pair of crossed combined handle and jaw members, said members being pivoted together at the point of crossing thereof, the jaw portions of said members presenting a pair of opposed gripping surfaces, and a cutting blade upon the side of one of said jaws, said blade having a cutting edge adapted to cooperate with the other of said jaws to shear an article placed therebetween, an extension on said cutting blade directed over the side of said last-mentioned jaw portion, said extension being provided with an elongated opening and a pin upon said last-mentioned jaw extending into the opening in said extension and co-operating therewith to guide said cutting blade and said last-mentioned jaw when the same are moved toward each other.

12. In a hand tool, a pair of crossed combined handle and jaw members, said members being pivoted together at the point of crossing thereof, the jaw portions of said members presenting a pair of opposed gripping surfaces, and a cutting blade upon the side of one of said jaws, said blade having a cutting edge adapted to cooperate with the other of said jaws to shear an article placed therebetween, an extension on said cutting blade directed over the side of said last-mentioned jaw portion, said extension being arcuate in form having its center at the pivot point of said members and being provided with an elongated opening and a pin upon said last-mentioned jaw extending into the opening in said extension, and cooperating therewith to guide said cutting blade and said last-mentioned jaw when the same are moved toward each other.

13. A hand tool, comprising a pair of combined handle and jaw members pivotally secured together, each of said members being formed from a single strip of flat sheet-metal, said sheet-metal being bent over itself along its longitudinal center line for a portion of its length to form said handle members, whereby said handle member is substantially U-shaped in cross-section and being overlapped into contact with itself for another portion of its length to form a laminated jaw member.

14. A hand tool, comprising a pair of combined handle and jaw members operatively secured together, each of said members being formed from a single strip of flat sheet-metal, said sheet-metal having one edge bent over the opposite edge along the longitudinal center line of said strip for a portion of its length, thereby presenting a substantially U-shaped cross-section and being spaced apart at an intermediate portion and in abutment to form a contacting end portion.

15. In a hand tool, a pair of members, each being formed from a strip of sheet-metal and each comprising a handle portion U-shaped in cross-section at one end thereof, the arms of the U-shape of each member being extended and those of one member straddling and crossing those of the other, a pivot pin through each pair of arms at the point of crossing, means to urge said members apart into open position, and a pawl pivoted to one arm of one member and adapted to engage in a notch in an arm of the other member to retain said members together in closed position.

In witness whereof, I have hereunto set my hand this 24 day of July, 1925.

WILLIAM A. BERNARD.